US005517891A

United States Patent [19]

Sica

[11] Patent Number: 5,517,891

[45] Date of Patent: May 21, 1996

[54] GUITAR PICK GUARD

[76] Inventor: Marc V. Sica, 137 Fieldstone Rd., Staten Island, N.Y. 10314

[21] Appl. No.: 399,740

[22] Filed: Mar. 7, 1995

[51] Int. Cl.[6] ..................... G01D 1/08; G01D 3/00

[52] U.S. Cl. ..................... 84/453; 84/267; 84/291; 84/452 R; D17/20

[58] Field of Search ..................... 84/453, 267, 291, 84/452 R; D17/20

[56] References Cited

U.S. PATENT DOCUMENTS

| | | | |
|---|---|---|---|
| D. 320,222 | 9/1991 | Tornese | D17/20 |
| 4,000,678 | 1/1977 | Messina | 84/453 |
| 4,177,847 | 12/1979 | Spindler | 84/453 |
| 4,362,079 | 12/1982 | Kelly | 84/291 |
| 4,373,417 | 2/1983 | Wilson et al. | 84/267 |
| 4,522,101 | 6/1985 | Peavey et al. | 84/267 |
| 4,538,497 | 9/1985 | Smith | 84/291 |
| 4,977,808 | 12/1990 | Thacher | 84/291 |
| 5,267,499 | 12/1993 | Othon | 84/291 |

*Primary Examiner*—Cassandra C. Spyrou
*Attorney, Agent, or Firm*—Goldstein & Associates

[57] ABSTRACT

The invention is a guitar pick guard, for mounting on a guitar having a guitar body, a neck, and a bridge. The guitar pick guard is mounted to the guitar body between the neck and the bridge. The guitar pick guard has a top layer, a bottom layer and a middle layer. The top layer is made of fabric. The bottom layer is made of a soft felt material. The middle layer is made of a flexible rubber, plastic or vinyl material.

14 Claims, 2 Drawing Sheets

GUITAR PICK GUARD

BACKGROUND OF THE INVENTION

The invention relates to a guitar pick guard. More particularly, the invention relates to an improved pick guard that is mounted to a standard guitar or bass guitar.

Customized guitars have become increasingly popular. Often, the guitar represents a significant investment, and pride is taken in maintaining its finish and overall appearance.

A stiff acrylic pick guard is standardly used on guitars to prevent damage to the guitar finish from accidental scraping by a pick. These pick guards often extend beneath the strings, and extend to the lower edge of the guitar, to protect the guitar finish where it is most likely to be accidentally struck by a pick.

These standard pick guards are usually available in a few uniform hues, such as white, black, gray, or a solid color. Due to the nature of their manufacture, only limited colors are available. Having a custom pattern impregnated within the pick guard is unheard of.

The standard pick guard has holes in a screw pattern that matches the guitar on which it is to be applied. Further, each of these screw holes are countersunk to allow the screws to penetrate the pick guard to a point where the top of the screw heads rest at or below the top planar surface of the pick guard. However, even among different copies of the same model guitar, the screw pattern can differ. A typical guitar owner normally has neither the tools to punch a hole in a solid acrylic pick guard, nor to countersink the holes to accommodate the screw heads. Thus, pick guards must be manufactured to accommodate every conceivable screw pattern on every conceivable model of guitar.

In addition, acrylic, and indeed most types of plastic, has the tendency to scratch. Thus, although the guitar finish might be protected from scratching, the pick guard endures a great deal of scratching. Ultimately the pick guard must be replaced when the scratches become unsightly.

Further, the palm and wrist have a tendency to come into contact with the pick guard often while the guitar is being played. A hard acrylic pick guard does little to prevent hand fatigue and abrasion during extended play. Moisture from sweat has the tendency to get on the surface of the acrylic pick guard, making it slippery. When the pick guard is slippery, it becomes quite difficult to steady one's wrist firm against the pick guard for complex picking.

While the purpose of a conventional acrylic pick guard is to prevent damage to the guitar, often it does quite the opposite. If the pick guard is not tightly fastened to the guitar, or if care is not taken during installation and removal of the pick guard, the guitar finish can be easily scratched.

While these units may be suitable for the particular purpose employed, or for general use, they would not be as suitable for the purposes of the present invention as disclosed hereafter.

SUMMARY OF THE INVENTION

It is an object of the invention to produce a pick guard for installation on a guitar, to overcome shortcomings in the prior art. The pick guard has a fabric top layer. The fabric top layer may have a custom pattern to suit the guitar owner's preference.

It is another object of the invention to provide a pick guard having a felt bottom layer, to prevent abrasion to the guitar's finish.

It is a further object of the invention to provide a flexible middle layer, between the top layer and bottom layer, to provide strength to the pick guard so that it may provide support for potentiometers and switches on the guitar front panel, while maintaining an overall planar appearance. The soft middle layer further allows the pick guard to be easily punctured to customize the screw pattern. When screws are inserted through the screw holes thus created, their screw heads pinch the soft middle layer, as well as the top layer and bottom layer, to bring the screw head below the top surface of the top layer.

It is a still further object of the invention.

The invention is a guitar pick guard, for mounting on a guitar having a guitar body, a neck, and a bridge. The guitar pick guard is mounted to the guitar body between the neck and the bridge. The guitar pick guard has a top layer, a bottom layer and a middle layer. The top layer is made of fabric. The bottom layer is made of a soft felt material. The middle layer is made of a flexible rubber, plastic or vinyl material.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
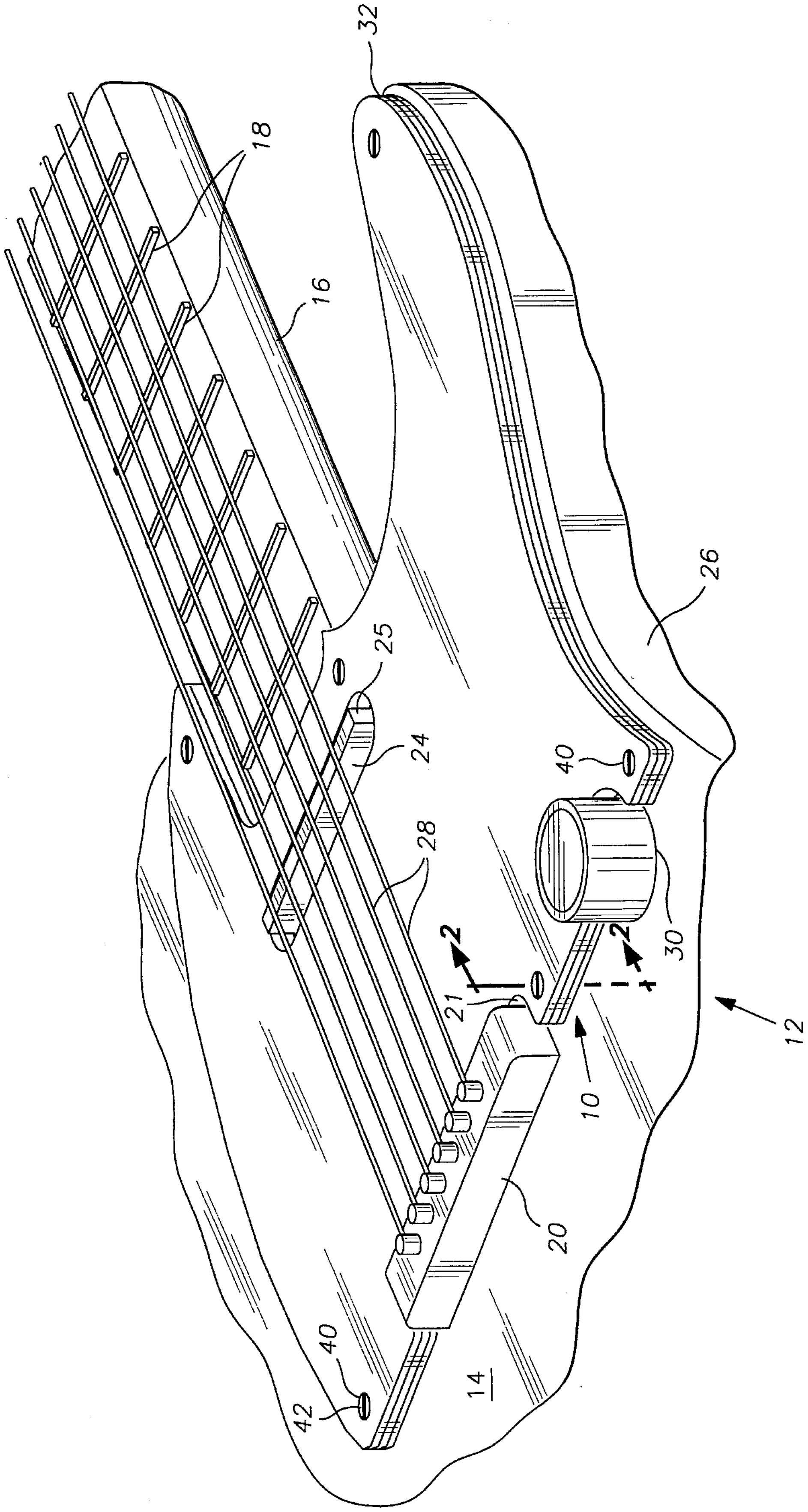
FIG. 1 is a diagrammatic perspective view of the instant invention installed on a typical guitar.

FIG. 1 illustrates a pick guard 10 installed on a guitar 12. The term "guitar" as used herein refers to any type of guitar, including a standard guitar and a bass guitar. The guitar 12 has a body 14 and a neck 16 attached to the body 14, the neck 16 having frets 18. A bridge 20 is attached to the body 14. A pick-up 24 is attached to the body 14 between the bridge 20 and the neck 16. The guitar has a guitar right 26, to the right of the bridge 20. Strings 28 extend from the bridge 20, over the pick-up 24, and then along the neck 16. A potentiometer 30 is located on the body between the bridge 20 and the guitar right 26.

A head, having tuning pegs is attached to the neck opposite the body. In general, the strings 28 are fastened at one end to the bridge 20, and at the other end to the tuning pegs. A right handed person will play the guitar 12 with the their right hand extending from the guitar right 26 toward the strings 28, their wrist resting near the guitar right 26. The strings 28 are selectively strummed or picked, using a pick, to cause selected strings 28 to vibrate. One or more strings 28 may be held against the frets 18 at various points to alter the frequency of the vibrations. The strings 28 extend over the pick-up 24, where sound generated by the vibrating strings are detected for further amplification.

The pick guard 10 covers a portion of the body 14, beneath the strings 28, to protect the body 14 from becoming scratched during picking and strumming motions with the pick. The pick guard 10 generally extends between the bridge 20 and the neck 16, and extends to near the guitar right 26. The pick guard 10 has a bridge indent 21 which fits snugly around the bridge on three sides. The pick guard 10 has a potentiometer cutout 31 which may partially or fully surround a potentiometer 30 that is used for volume or tonal control. In addition, the guard 10 has a pick-up cutout 25, which allows the pick-up 24 to extend through the pick guard 10.

The pick guard 10 has screw holes 40 at various locations to match a screw pattern of the guitar body 14. Screws 42 extend through the screw holes 40 to fasten the pick guard 10 to the guitar body 14.

The pick guard has an edge 32 which defines the border of the pick guard 10. The edge is shown in FIG. 1 as being perpendicular to the overall plane of the pick guard 10. However, the edge 32 may be beveled for a smoother transition between the guitar body 14 and the pick guard 10.

Figure 2:
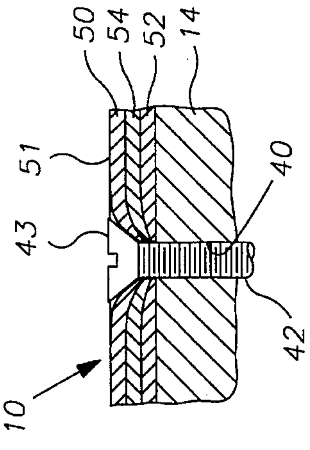
FIG. 2 is a cross sectional view, taken along line 2—2 in FIG. 1, illustrating the layers of the invention pinched by a screw head.

FIG. 2 is a cross sectional view, illustrating the multi-layered construction of the pick guard 10. The pick guard 10 has a top layer 50 a bottom layer 52, and a middle layer 54. The top layer 50 comprises fabric. The top layer 50 has a top surface 51. The fabric may have an integral pattern or an imprinted pattern, suited to the guitar owner's taste. A fabric such as denim or military camouflage might be used. In addition, fabric, as defined herein, can also include genuine and fake animal skins, such as snake, lizard and pony skin. Further, a hologram may be bonded or coated onto the fabric, to allow a holographic image to be created.

The bottom layer 52 is preferably made of felt or some other velvet-like soft material, to prevent scuffing the guitar body 14.

The middle layer 54 is essentially for the purpose of providing strength to the pick guard 10. The middle layer 54 is preferably made of a flexible rubber, plastic, or vinyl. The middle layer 54 should provide the pick guard with sufficient strength so that the pick guard can maintain a planar appearance, even where the pick guard extends over hollow areas in the guitar body, such as where sound processing electronics are ordinarily mounted. In the absence of the middle layer, it is possible that fabric may be chosen to maintain such a planar quality, as long as the fabric is pulled taught while the pick guard 10 is being mounted to the guitar body 14.

The screw 42 extends through the screw hole 40. The screw 42 has a screw head 43. The screw 42 has been tightened into the screw hole 40, causing the screw head 43 to exert pressure upon the pick guard 10. The pressure upon the pick guard 10 causes the layers of the pick guard 10 to become pinched, and compressed. Thus, the screw head 43 sinks below the top surface 51.

Thus a three layer construction is described. This construction has several advantages as follows:

1. The fabric top layer allows a guitar owner to customize the appearance of the guitar by selecting a fabric top layer that has a pleasing pattern, that matches the guitar finish, or that matches a guitar strap used with the guitar. Previously, only solid colors were available, and it was not possible to match a multicolored guitar strap. In addition, the fabric enhances comfort to a person playing the guitar for an extended time, by providing a softer resting spot for the wrist or fingertips, and by absorbing moisture.

2. The felt bottom layer prevents scuffing and scratching of the guitar finish, while the pick guard is being mounted or removed, and if the pick guard is loosely mounted to the guitar body. The bottom and top layer, comprising fabric and felt, have the tendency to absorb sound, and thus have a dampening effect that can produce desirable effects that are sought after by many guitar players. In addition, this dampening effect can eliminate stray vibrations and undesirable "buzzing", which is often unfortunately detected by the pick-up and amplified.

3. The flexible rubber or vinyl middle layer is lightweight, and generally makes the pick guard considerably lighter than standard solid acrylic pick guards, while providing strength to maintain an overall planar appearance.

4. The middle layer allows the pick guard to be easily mounted to a variety of guitars, having a variety of different screw patterns. The rubber or vinyl middle layer allows the pick guard to be easily punctured with a nail or center punch, to allow the user to match the screw pattern of their guitar. A conventional pick guard is made of solid acrylic, which cannot be punctured without a high speed drill. Further, to accommodate a standard screw head, each hole must be countersunk to the size of the screw head. To countersink a hole, a special drill bit is required. In contrast, the present invention allows a user to puncture the pick guard without special tools, using a nail or center punch. The user can duplicate the guitar screw pattern by "tracing" the screw pattern from the guitar itself, or by using a pick guard it is replacing as a guide. The soft construction of the pick guard allows the screws to be tightened until the layers are pinched sufficiently under the pressure of the screw head, so that the screw head sinks below the top surface 51 of the top layer 50.

Figure 3:
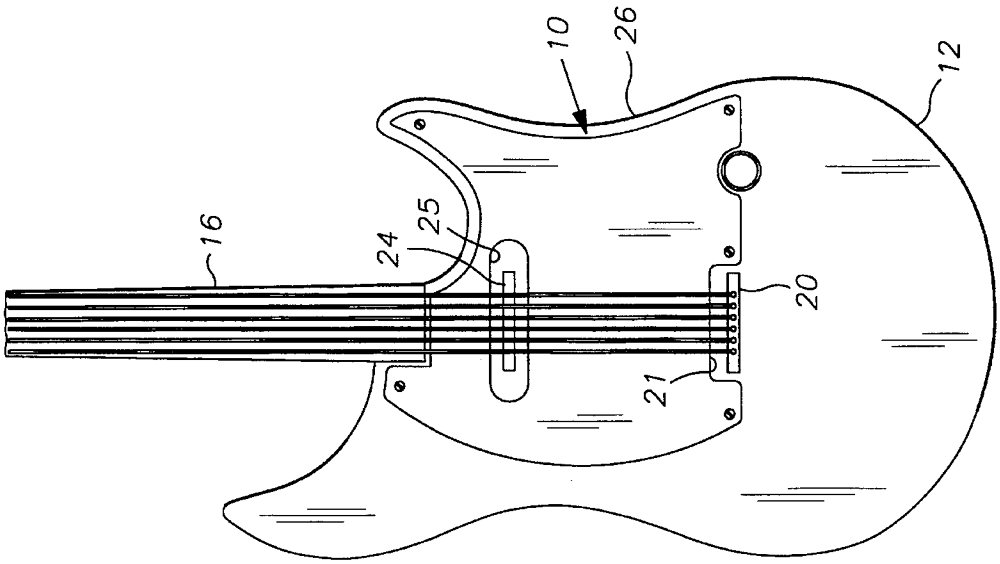
FIG. 3 is a top plan view of a first embodiment of the invention installed on a typical guitar.

FIG. 3 illustrates an embodiment of the pick guard installed on a typical guitar 12. The bridge 20 fits snugly within the bridge indent 21. The pick-up 24 extends through the pick-up cutout 25. The pick guard 10 extends between the bridge 20 and the neck 16, and extends to near the guitar right 26.

Figure 4:
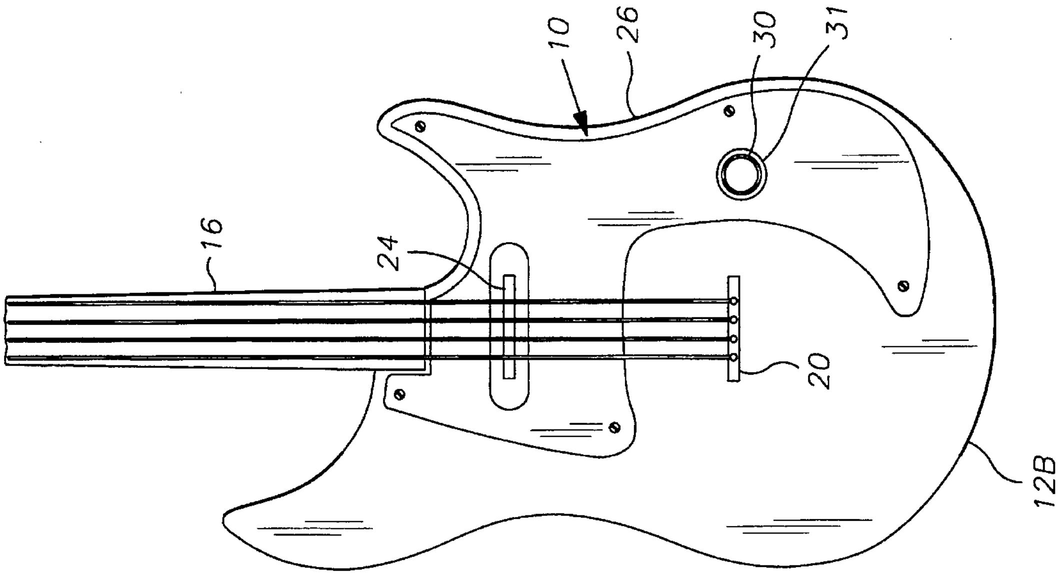
FIG. 4 is a top plan view of a second embodiment of the invention installed on a typical bass guitar.

FIG. 4 illustrates an alternate embodiment of the pick guard 10 installed on a bass guitar 12B. In this embodiment, the pick guard 10 does not extend fully to the bridge 20. Instead, the pick guard 10 extends to a point approximately midway between the pick-up 24 and bridge 20, and then skirts around the bridge toward the guitar right 26, and extends further away from the neck 16 than the bridge 20. Also in this embodiment, the potentiometer 30 is fully surrounded by the potentiometer cutout 31 of the pick guard 10. Thus, the pick guard 10 must support the weight of the potentiometer. Although a typical potentiometer 30 used as a volume or tonal control in a guitar is a lightweight item (on the order of an ounce), the pick guard should possess sufficient strength so as to support the weight of the potentiometer 30 without distorting the overall planar appearance of the pick guard 10.

In conclusion, herein is presented a guitar pick guard having a novel construction, which presents significant advantages over the prior art, and produces results previously unanticipated and unattained.

What is claimed is:

1. A guitar pick guard, for mounting on a guitar having a guitar body, a neck attached adjacent to the guitar body, and a bridge on the guitar body, the guitar body having a guitar right, comprising:

a top layer, the top layer made of fabric, mounted to the guitar body, extending on the guitar body beneath the strings between the bridge and the neck.

2. The guitar pick guard as recited in claim 1, further comprising:

a bottom layer, the bottom layer made of felt, the bottom layer substantially the same size and shape as the top layer, wherein the bottom layer and top layer are attached to one another.

3. The guitar pick guard as recited in claim 2, further comprising:

a middle layer, the middle layer made of a flexible plastic, the middle layer substantially the same size and shape as the top layer and bottom layer, wherein the middle layer extends between the top layer and bottom layer to connect the top layer and bottom layer together and to give the pick guard strength to maintain an overall planar appearance.

4. The guitar pick guard as recited in claim 3, wherein the pick guard extends on the guitar body to near the guitar right.

5. The guitar pick guard as recited in claim 4, wherein the guitar has a pickup extending from the guitar body, mounted between the bridge and the neck, the guitar has a potentiometer extending from the guitar body, and wherein the pick guard further comprises:

a bridge indent, the bridge indent fits snugly around the bridge on three sides;

a pickup cutout, the pickup cutout allowing the pick-up to extend through the pick guard; and a potentiometer cutout, the potentiometer cutout closely accommodating a potentiometer.

6. The guitar pick guard as recited in claim 5, wherein the potentiometer is a volume control potentiometer, and the potentiometer cutout accommodates and supports the potentiometer, the pick guard having sufficient strength to support a potentiometer.

7. The guitar pick guard as recited in claim 6, wherein the guitar body has a screw pattern, and the pick guard has screw holes that match the screw pattern, so that the pick guard may be fastened to the guitar body using screws.

8. The guitar pick guard as recited in claim 4, wherein the pick guard extends on the guitar body in a direction away from the neck, and extends past the bridge.

9. The guitar pick guard as recited in claim 8, wherein the guitar has a pick-up between the neck and bridge, and the pick guard extends from the neck to a point midway between the pick-up and bridge, and then skirts the bridge toward the guitar right.

10. The guitar pick guard as recited in claim 9, wherein the guitar body has a screw pattern, and the pick guard has screw holes that match the screw pattern, so that the pick guard may be fastened to the guitar body using screws.

11. A guitar pick guard method, for partially covering a guitar body of a guitar having a neck attached adjacent to the guitar body and a bridge attached on the guitar body;

providing a guitar pick guard having a top layer made of fabric, and sized to cover the guitar between the bridge and neck; and mounting the guitar pick guard to the guitar body beneath the strings between the bridge and neck using screws.

12. The method as recited in claim 9, wherein the guitar has a screw pattern, the top layer has a top surface, and the step of mounting the guitar pick guard to the guitar body further comprises:

puncturing the pick guard with an item selected from a punch and a nail, to create screw holes that match the screw pattern;

Extending screws having screw heads through the screw holes; and fastening the pick guard to the guitar by tightening the screws until the screw heads compress the pick guard sufficiently so that the screw heads sink below the top surface.

13. The method as recited in claim 10, wherein the pick guard further comprises:

a bottom layer, made of a soft material; and a middle layer, made of flexible plastic, the middle layer mounted between the top layer and bottom layer.

14. The method as recited in claim 13, wherein the method does not include the step of countersinking the screw holes to accommodate the screw heads.

* * * * *